Patented Feb. 11, 1941

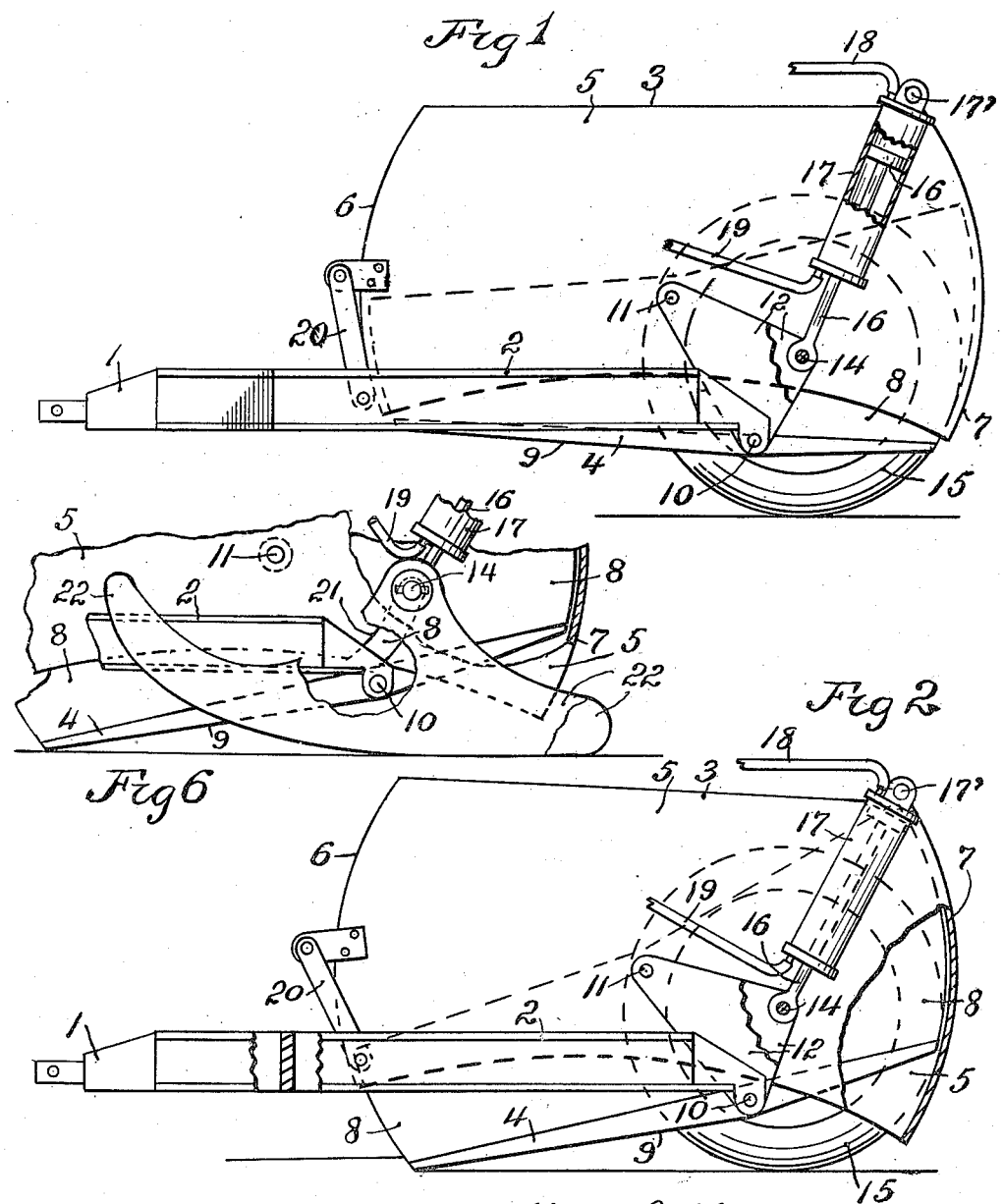

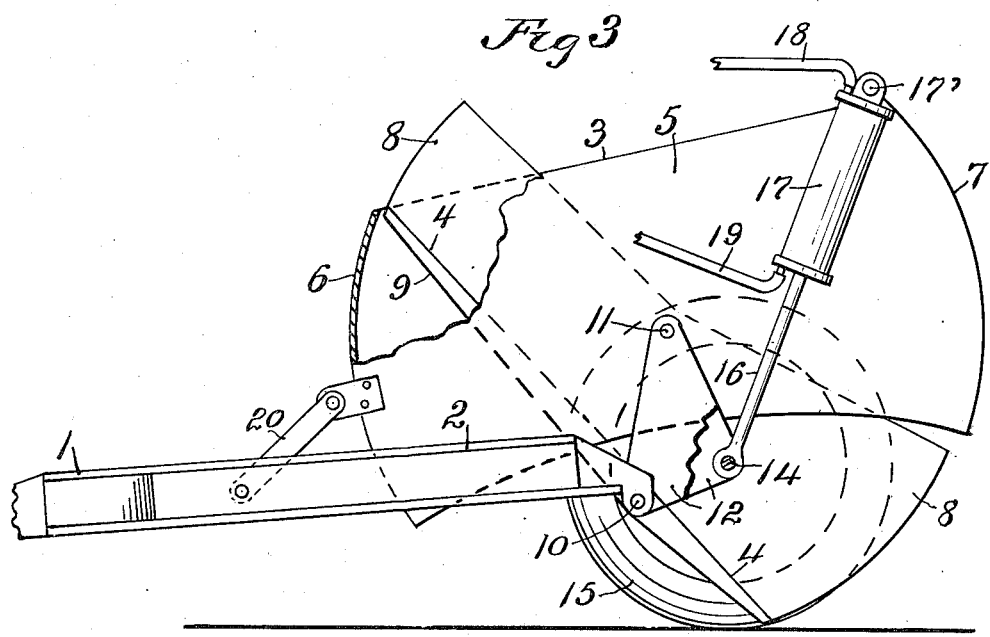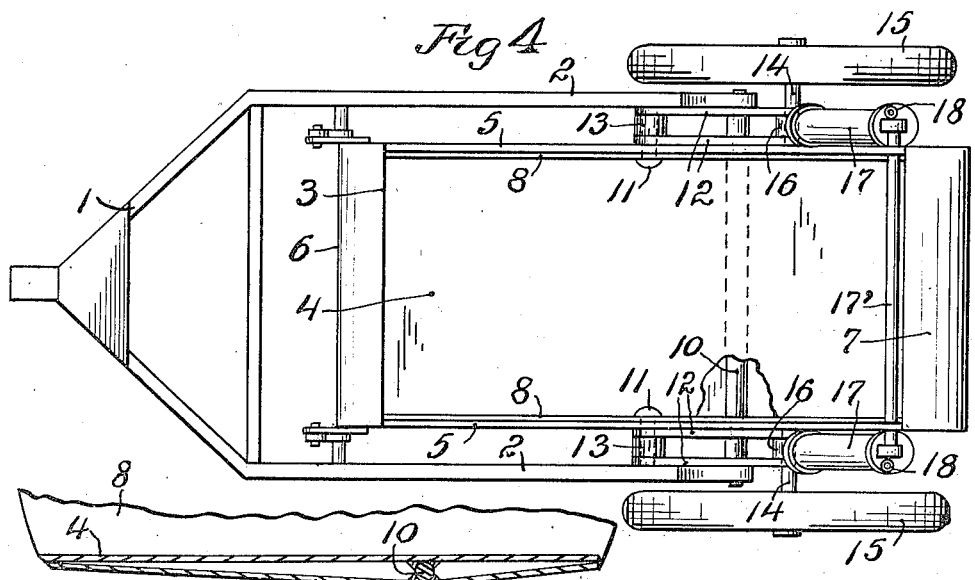

2,231,625

UNITED STATES PATENT OFFICE 2,231,625

SCRAPER

Albert R. Henry, Salina, Kans., and Marion C. Wills, Kansas City, Mo.

Application March 6, 1939, Serial No. 259,938

10 Claims. (Cl. 37—129)

Our invention relates to scrapers of the type adapted for scraping up a load of earth, carrying the load and then dumping it where desired.

One of the objects of our invention is the provision of a novel scraper of the kind described, embodying a frame adapted to be drawn by horse power or a tractor, a bowl comprising a body, open at the bottom and having side walls, a front wall and a rear wall rigid with each other, and a bottom scraping member pivotally supporting and adapted to swing in the body from a scraping to a load carrying and thence to a rearwardly inclined dumping position, novel means being provided for so supporting the body and for so swinging the bottom scraping member.

Another object of our invention is the provision of novel means for swinging the body so that its rear wall will be raised and its front wall lowered when the bottom scraping member is swung from the scraping to the dumping position, whereby, when the scraping bottom member is in the scraping position the front wall of the body will be raised out of the way, and when the scraping bottom member is swung to the dumping position, the rear wall of the body will be raised to a maximum height to provide a wide area between the rear wall of the body through which the load can be quickly dumped.

Still another object of our invention is the provision of a novel scraper of the kind described, which is simple, strong, durable, not likely to get out of order, which has novel operating means easily and quickly operable from the tractor by which it is drawn, which will easily and quickly scrape up a load, safely transport it and quickly dump it, and which is efficient in its operation.

The novel features of our invention are hereinafter fully described and claimed.

In the accompanying drawings, which illustrate different embodiments of our invention, Fig. 1 is a side elevation, partly broken away, of one form of our invention, shown adjusted to the load carrying position and employing carrying wheels.

Fig. 2 is a view of what is shown in Fig. 1, partly broken away, and showing the scraper in the scraping position.

Fig. 3 is a side elevation of the scraper shown in Figs. 1 and 2, partly broken away, showing the scraper and bowl body in the dumping position.

Fig. 4 is a plan view, partly broken away, of the form shown in Figs. 1, 2 and 3, shown in the load carrying position.

Fig. 5 is a longitudinal vertical sectional view of the lower portion of the bottom scraper member.

Fig. 6 is a side fragmental view, partly in side elevation and partly broken away, of a modified form of our invention, shown in the scraping position, and employing sled runners as a support.

Referring to Figs. 1 to 5, 1 is the front part of a draft frame, the front end of which is to be hitched to a tractor, the frame having two rearwardly extending arms 2.

The scraper has a bowl comprising a body 3 and a bottom scraper member 4. The body has two side walls 5, an arcuate front wall 6 and an arcuate rear wall 7, the body being between the arms 2, and having an open top and bottom.

The scraper member 4 is of flat sheet metal and has side walls 8 extending upwardly between the walls 5 of the body. The bottom member is reenforced underneath by a sheet metal plate 9 made integral with the front and rear ends of the bottom member 4.

A transverse shaft 10, having its ends respectively pivoted in the rear portions of the arms 2 of the draft frame, extends between and is made integral with, as by welding, to the plates 4 and 9 at a substantial distance from the front and rear ends thereof.

The side walls 8 of the bottom member 4 are respectively disposed close to the inner sides of the side walls 5 of the body 3, to which side walls 5 the side walls 8 are respectively pivoted on a transverse axis by alined pins 11 made rigid, as by welding, to the walls 8.

The axis in which said pins 11 are located is the center of the radii of the concave inner sides of the front wall 6 and rear wall 7 of the body 3. The front and rear ends of the bottom member 4 likewise have the said axis as the center of their radii, the latter being slightly shorter than those of the front and rear walls of the body 3, whereby, when the bottom member 4 is swung on the pins 11, its front and rear ends will be adjacent to but will clear respectively the end walls 6 and 7 of the body 3.

The transverse shaft 10, as shown, is at a substantial distance from the front and rear ends of the bottom member 4, whereby, when the latter scrapes up a load, the load will be partly counterbalanced.

For simultaneously oscillating in opposite directions, the body 3 and the bottom scraping member 4, the latter on its axis in which is disposed the shaft 10, and the body on its axis in which are located the pins 11, the following described structure is provided.

Two pairs of vertical members, comprising flat plates 12, are respectively disposed between the side walls 6 of the body 3 and the arms 2 of the draft frame. The plates 12 of each pair have extending through and tightly fitted to them, the shaft 10 and the adjacent pin 11, whereby the plates 12 are movable and rigid with the bottom member 4. Two collars 13 respectively on the pins 11 are disposed between the adjacent plates 12, Fig. 4.

Two transverse outwardly extending spindles 14 respectively extend through and are rigidly fastened to and made integral with the two pairs of plates 12, and are pivotally supported respectively on two carrying wheels 15 adapted for travel on the ground.

The bottom member 4 being thus made movable and integral with the spindles 14 can, with the body 3 be swung on an axis which is parallel with the axes in which are located the shaft 10 and pins 11.

Means are provided pivotally connected with the spindles 14 and with the body 3 by which the rear wall of the body 3 may be raised simultaneously with the swinging of the bottom scraping member 4 from the scraping position shown in Fig. 2 to and past the load carrying position, shown in Fig. 1, to the dumping position, shown in Fig. 3. As shown, such means comprises two pistons 16 respectively pivoted to the spindles 14, between the plates 12, and reciprocative respectively in two cylinders 17, the upper ends of which are pivoted on a transverse axis to a bar 17' extending through and supported by the sides 5 near the end 7.

Two tubes 18 and 19 are respectively connected to each cylinder 17 at opposite ends of the head of the adjacent piston 16. Suitable means, not shown, but which is well known in the art, is provided for alternately admitting and discharging fluid, as oil, under compression, for reciprocating the pistons 16.

For swinging downwardly the front wall 6 of the body 3, when the rear wall of the body is raised, and for limiting the ranges of oscillation of the bowl 3 and of the bottom member 4, two links 20 are pivoted respectively to the arms 2 of the draft frame, and to opposite side walls 6 of the body 3, forward of the pins 11, and, preferably adjacent to the front wall 6, as shown.

The front edge of the bottom scraping member 4 is a sharp cutting edge, which, when the bottom member is in the lowered scraping position, shown in Fig. 2, and the draft frame is drawn forwardly, scrapes the earth onto the bottom member 4 until the body 3 is filled.

If now fluid under pressure is admitted through the tubes 18 into the cylinders 17, as the pistons 16 are bearing on the spindles 14, the cylinders will be raised, thus lifting the rear wall 7 of the body 3, and causing the plates 12 to revolve clockwise, as viewed in Figs. 1 and 2, thereby causing the bottom member 4 to swing upwardly at its front cutting edge to the load carrying position, shown in Fig. 1.

If flow is now prevented, in the usual manner, through the tubes 18 and 19, the bottom member 4 and the body 3 will remain in the load carrying position, shown in Fig. 1, and the load may then be transported to the place at which it is desired to dump the load.

If now fluid under pressure is again admitted through the tubes 18 into the cylinders 17 above the pistons 16, the cylinders will be raised to the position shown in Fig. 3, thus lifting the rear wall 7 higher, and at the same time swinging the bottom member 4 to the rearwardly inclined dumping position, shown in Fig. 3, at which time the links 20 will have swung the front wall 6 of the body 3 lower, whereby a wide space is created between the rear end of the bottom member 4, and the lower edge of the rear wall 7 of the body 3, thus providing a wide open area through which the load is quickly discharged.

By then permitting the fluid to enter the cylinders through the tubes 19, and to return from above the pistons through the tubes 18, the body 3 and bottom scraping member 4 will lower to the load carrying position, shown in Fig. 1, where they may be retained by shutting off passage of fluid through the tubes 18 and 19. When desired, the body 3 and bottom member 4 can be permitted to lower further to the scraping position, shown in Fig. 3, thus completing a cycle in the operation of the scraper.

In the modification shown in Fig. 6, sled runners 22 have been substituted for the wheels 15 on the spindles 14. The said spindles are shown mounted directly upon the sides 8 of the bottom member 4, and the plates 12 and collars 13 are eliminated, and arcuate slots 21 are provided in the lower edges of the sides 6 of the body 3, to receive the spindles 14 when the bottom member 4 and body 3 are in the positions shown in Figs. 1 and 2. In other respects the construction conforms to that shown in Figs. 1 to 4. When desired, the runners may be replaced by the wheels.

It will be noted that, by having the axis comprising the shaft 10 located at a substantial distance from the rear end of the bottom member 4, when the bottom member is in the inclined dumping position, shown in Fig. 3, the rear end of the bottom member 4 will be disposed close to but clearing the ground. By reason of this construction, after a load has been dumped, it can be immediately leveled by simply backing the scraper. In the form shown in Figs. 1 to 4, the wheels 15 form carrying means adapted for travel on the ground and pivotally supporting the spindles 14 which are rigid integral parts of the bottom member 4. In the form shown in Fig. 6, the sled runners 22 form the carrying means pivotally supporting the bottom member 4 through the spindles 14 of the latter. The bottom member 4 through the pins 11 pivotally supports the bowl 3, and through its shaft 10, it pivotally supports the rear end of the frame 1—2.

The pistons 16 and cylinders 17 oscillate the bowl on its axis 11. The links 20 pivotally connecting the bowl with the draft frame causes the bowl axis 11 to swing up and down around the axis 14 when the bowl is oscillated by the pistons 16 and cylinders 17, thereby oppositely oscillating the bottom member 4 on its axis 14 when the bowl is oscillated. The pistons 16, cylinders 17 and links 20 thus constitute means for oppositely simultaneously oscillating the bowl 3 and bottom member 4 and for limiting their ranges of oscillation relatively to the draft frame and to each other.

Other modifications of our invention, within the scope of the appended claims, may be made without departing from the spirit of our invention.

What we claim is:

1. In a scraper, in combination, carrying means, a draft frame, a bowl open at the bottom and having front, rear and side walls, a bottom member between and pivoted on a transverse axis to said side walls and pivotally supporting said bowl on said axis and having a front scraping edge, and pivoted on a transverse axis on said frame, and pivoted to said carrying means on an axis parallel with said axes so as to swing upwardly at said edge from a forwardly and rearwardly extending position to a position closing the bottom of said bowl, and means for oppositely simultaneously oscillating said bowl and said bottom member and for limiting their ranges of oscillation.

2. In a scraper, in combination, carrying means, a draft frame, a bowl open at the bottom and having front, rear and side walls, a bottom member between and pivoted on a transverse axis to said side walls and pivotally supporting said bowl on said axis and having a front scraping edge, and pivoted on a transverse axis on said frame, and pivoted to said carrying means on an axis parallel with said axes so as to swing upwardly at said edge from a forwardly and rearwardly extending position to a position closing the bottom of said bowl, and thence upwardly to a rearwardly facing dumping position, and means for oppositely simultaneously oscillating said bowl and said bottom member.

3. In a scraper, in combination, a draft frame, a bowl open at the bottom and having front, rear and side walls, a bottom member between and pivoted on a transverse axis to said side walls and pivotally supporting said bowl on said axis, and having a front scraping edge and pivoted on an axis parallel to said axis to said frame so as to swing upwardly at said front edge to a load carrying position closing said open bottom, carrying means adapted for travel on the ground and to which said bottom member is pivoted and adapted to swing on an axis parallel with said axes, and means for simultaneously oppositely oscillating said bowl and said bottom member and for limiting their ranges of oscillation.

4. In a scraper, in combination, a draft frame, a bowl open at the bottom and having front, rear and side walls, a bottom member in said bowl on which said bowl is pivoted on a transverse axis, said bottom member having a front scraping edge and pivoted on said frame on an axis parallel with said axis to swing upwardly at said front edge to a load carrying and to a rearwardly facing dumping position from a lower scraping position, two carrying wheels on which said bottom member is pivoted on an axis parallel with said axes, means for oscillating said bowl, and means connecting said bowl with said frame for simultaneously oppositely oscillating said bottom member and for limiting their ranges of oscillation.

5. In a scraper, in combination, a draft frame, a bowl open at the bottom and having front, rear and side walls, a bottom member pivoted on a transverse axis on said frame and disposed in and pivotally supporting said bowl forward of its rear wall on a transverse axis, said bottom member having a front scraping edge and adapted to swing on said frame from a lower scraping position to and past a loading position closing said open bottom to a rearwardly facing dumping position, carrying wheels, said bottom member having two spindles pivotally supported respectively on said wheels and pivotally supporting said bottom member on an axis parallel with said axes, means for oscillating said bowl, and means connecting said bowl to said frame for simultaneously oppositely oscillating said bottom member and for limiting their ranges of oscillation.

6. In a scraper, in combination, a draft frame, a bowl open at the bottom and having front, rear and side walls, a bottom member pivoted on a transverse axis on said frame and disposed in and pivotally supporting said bowl forward of its rear wall on a transverse axis, said bottom member having a front scraping edge and adapted to swing on said frame from a lower scraping position to and past a loading position closing said open bottom to a rearwardly facing dumping position, carrying wheels, said bottom member having two spindles pivotally supported respectively on said wheels and pivotally supporting said bottom member on an axis parallel with said axes, means for oscillating said bowl, and means connecting said bowl to said frame for simultaneously oscillating said bottom member and for limiting their ranges of oscillation.

7. In a scraper, in combination, a draft frame, a bowl open at the bottom and having front, rear and side walls, a bottom member pivoted on a transverse axis to said side walls and pivotally supporting said bowl on said axis and having a front scraping edge and pivoted on an axis parallel with said axis to said frame, so as to swing upwardly at its front edge from a scraping position to a load carrying position closing said open bottom and thence to a rearwardly facing dumping position, carrying means adapted for travel on the ground, said bottom member being pivoted on said carrying means on an axis parallel with said axes, means for raising and lowering said rear wall, and means connecting said bowl to said frame for at the same time raising and lowering said front edge and for limiting the ranges of oscillation of said bowl and said bottom member.

8. In a scraper, in combination, a bowl open at the bottom and having front, rear and side walls, a draft frame, a bottom member in said bowl and pivotally supporting the latter on a transverse axis, and having a front scraping edge and pivoted on said frame on an axis parallel with said axis so as to swing at said front edge from a lower scraping position upwardly past a load carrying position closing said open bottom, to a rearwardly facing dumping position, carrying means adapted for travel on the ground, said bottom member being pivotally mounted on said carrying means on an axis parallel with said axes, means including a cylinder and a piston reciprocative in said cylinder for oscillating said bowl, means for reciprocating said piston and for holding it in the position to which it is moved, and means connecting said bowl with said draft frame by which said bottom member is oscillated simultaneously oppositely to said bowl and for limiting the ranges of oscillation of said bowl and said bottom member.

9. In a scraper, a draft frame, a bowl having an open bottom and front, rear and side walls, a bottom member between and pivoted on a transverse axis to said side walls, and having a front scraping edge and pivotally supporting said bowl on said axis and pivoted on a transverse axis to said frame, so as to swing upwardly at said front edge from a scraping position to a rearwardly facing dumping position, carrying means adapted for travel on the ground on which said bottom member is pivoted on an axis parallel with said axes, two members, one a cylinder and the other a piston reciprocative in said cylinder, one of said two members being pivoted to said bottom member and the other pivoted to said bowl, whereby when said piston is reciprocated, said bowl will be oscillated, and means connecting said bowl to said draft frame by which said bottom member will be oscillated simultaneously oppositely to said bowl.

10. In a scraper, a draft frame, a bowl having an open bottom and front, rear and side walls, a bottom member in said bowl supporting said bowl on a transverse axis and having a front scraping edge and pivoted to said frame on an axis parallel with said axis so as to swing upwardly at said front edge from a scraping position to and past a load carrying position closing said open bottom to a rearwardly facing dumping position, carrying means adapted for travel on the ground on which said bottom member is pivoted on an axis parallel with said axes, means for oscillating said bowl, and means connecting said bowl to said draft frame for swinging said bowl to raise its rear wall and simultaneously swing said bottom member to the dumping position, and for limiting the ranges of oscillation of said bottom member and said bowl.

ALBERT R. HENRY.
MARION C. WILLS.